United States Patent [19]
Heldenbrand et al.

[11] 3,811,769
[45] May 21, 1974

[54] VIEWER-COPIER APPARATUS

[75] Inventors: Stanley W. Heldenbrand; David L. Johnson, both of Dallas; Neil H. Mote, Richardson, all of Tex.

[73] Assignee: Seaco Computer-Display Incorporated, Garland, Tex.

[22] Filed: July 28, 1971

[21] Appl. No.: 166,953

[52] U.S. Cl. .................................. 355/45, 355/5
[51] Int. Cl. ........................................ G03b 27/70
[58] Field of Search .................... 355/5, 45; 95/4.5

[56] References Cited
UNITED STATES PATENTS
3,115,815  12/1963  Friedel ............................. 95/4.5 R
3,674,354   7/1972  Artaud et al ......................... 355/5

Primary Examiner—Samuel S. Matthews
Assistant Examiner—Richard A. Wintercorn
Attorney, Agent, or Firm—Kenneth R. Glaser

[57] ABSTRACT

An improved combination viewer-copier apparatus having an optical system for projecting a selected image from a microimage bearing film on a viewing screen sufficiently enlarged for viewing and for projecting an enlarged image on a record medium at an exposure position which is later developed to produce copies thereof. A light filtering means is provided for preventing light entering the apparatus through the viewing screen from reaching the undeveloped record medium. A sheet feeding apparatus is provided for feeding individual sheets of record medium from a stack containing a plurality of sheets and eventually conveying said sheets to the exposure position. A sheet handling means is also provided at an exposure position to hold the sheets in position by means of a pressure differential created across the paper. A developing means is also provided for contacting the paper with a continuously agitated developer fluid by means of a nozzle, pump and a moving roller. A pair of loaded squeeze rollers having a non-cylindrical shape are utilized after the application of the developer to remove excess fluid from the paper.

15 Claims, 13 Drawing Figures

VIEWER-COPIER APPARATUS

BACKGROUND OF THE INVENTION

The present invention relates to improvements in viewer-copier systems, and more particularly, to improvements in systems of the type which utilize microfiche cards to produce enlarged reproductions of the microimages arranged on the microfiche cards.

As is well known, the steadily increasing growth of industry and government in recent years, and the corresponding increase in information available and generated by same, has required an enormous increase in the number and variety of records and reports that must be made, maintained, disseminated, and kept available for use and subsequent copying. One system that has evolved to handle these increased demands is generally known as a microfilm data processing system. Generally, a microfilm data processing system comprises apparatus for: (1) copying onto film microimages of the original data, drawings, documents, memoranda, reports or other records to be stored; (2) storing the microfilm; (3) projecting and enlarging the microimages on a viewing screen to allow examination and retrieval of the information contained therein; and (4) producing, upon demand, hard copies of the information thereon.

One of the more efficient microfilm data processing systems utilizes a "microfiche" type of microfilm. A microfiche is a single sheet of film containing sequences of microimages which normally cannot be read by the unaided eye surrounded by a border area for titles, authors, names, classification data, and other information which can normally be read by the unaided eye. A microfiche may contain anywhere from several to several hundred microimages depending upon the size of the film sheets employed and the reduction ratio, each microfiche capable of recording and storing images, in both cine or comic orientation, of from several to several hundred pages of periodicals, books or reports for example. The microfiche is therefore ideal for containing related images and is unsurpassed when compared to other microfilm systems for economy, storage, ease of handling, and printout of images that may represent many pages of a single report or books occasionally or extensively reproduced for wide distribution.

Retrieval of the images contained on the microfiche card has been provided by apparatus which has been utilized not only to view, but also to reproduce enlarged hard copies of these microimages. One system which adapts well to this reproduction utilizes an electrostatic printing process. This process utilizes a recording medium which can comprise a base sheet, such as paper, of relatively poor electrical conductivity, which sheet is coated on at least one side with a photoconductive material such as zinc oxide suspended in an electrically insulating film forming vehicle. An overall electrostatic charge is applied to at least a portion of the photoconductive surface of the recording medium, and a light image corresponding to the microimage is projected upon the charged portion causing a charge pattern or latent image corresponding to the light image to be formed. This latent image may be stored for a period of time in the absence of light or may be immediately developed to render a permanent visible image on the record medium. Development may be carried out by applying an appropriate electroscopic developing substance capable of adhering only to the charged portions of the record medium. Alternatively, the developer may be one which adheres to the edges of the discharged portions of the charged image.

Accordingly, apparatus for projecting selected microimages of microfiche to a viewing screen and printing these images, upon command, on the copy material, has been developed utilizing the electrostatic approach for the printer portion of the apparatus. Generally, this apparatus includes optical means which projects an enlargement of the specific image to the viewing screen or to the printing or exposure station. Normally, the plurality of sheets of specially treated copy material or record medium are stored in a stack, and are initially fed therefrom by handling means to an electrostatic charger for charging the photoconductive surface. Thereafter, the sheets are transported to the exposure station where, held in place, they are exposed to the light image representing the selected microimage to produce the corresponding latent image thereupon. The paper is thereafter transported to a developing station where the latent image is made visible, and then ejected from the apparatus as the final hard copy printout. Thus, the image which is viewed at the screen can be reproduced in permanent form.

Although electrostatic viewer-copier devices of the type described above have served the purpose for which they were intended, they have not proved entirely satisfactory under all conditions of service for the reasons that considerable difficulty has been experienced in many areas which have detracted from the efficiency and quality of performance of these conventional systems.

One specific area in which difficulty has been encountered is in the separation of individual sheets from the stack in which the sheets are stored. This difficulty is due to the fact that the sheets of paper tend to stick together due to frictional and electrostatic forces between the adjacent sheets. This problem is especially present when individual sheets are simultaneously in contact with both the electrostatic charger and the stack from which the sheet is being fed. This common connection between the charging apparatus and the stack and the fact that the paper is coated with a conductive material results in a path being formed through which the electrostatic charge is transferred to the stack of individual sheets by the electrostatic charger apparatus. This charging of the stack increases the electrostatic forces between the adjacent sheets in the stack and, when considered in combination with the frictional forces present, there is a tendency for the sheets to stick together during the feeding operation. This may result in more than one sheet being fed through the copying cycle, and can result in jamming of the apparatus.

To reduce this problem, it has been proposed to position the electrostatic charging apparatus a sufficient distance away from the storage stack so that during feeding, the sheets will not be in contact with both the stack and the electrostatic charger. Although this configuration reduces the electrostatic charge in the stack, it fails to solve the problem of frictional forces between the adjacent sheets, increases the size of the apparatus and increases the amount of time required to produce a copy due to the increased distance the copy sheet must travel during the copying operation. It can be readily appreciated that the increased time in producing copies is a substantial disadvantage and that copies produced quickly and of good quality are desirable.

Another area in which difficulties have been encountered in the paper handling is at the exposure station. At this position the charged copy paper is normally positioned on the under side of a planar surface where is is exposed to the image for a period of time sufficient to produce the latent image thereon. During this exposure, it is not only essential that the paper be rigidly held in a flat position so that the image projection will not be distorted, but it is also desirable to quickly convey the paper into and out of the exposure position to reduce the time required to produce copies. Prior apparatus has not been entirely successful in accomplishing these objectives.

An additional area in which problems have been encountered in the production of electrostatic copies is in the application of the developer. To produce a copy of good quality it is important to not only apply a sufficient quantity of developer material to the charged side of the paper to adequately develop the image, but also to agitate the developer as it makes contact with the exposed portion of the surface. Additionally, because fluid developer becomes reduced in concentration as it is used, it is also desirable that the developer fluid itself be so circulated that developer of maximum concentration is placed in contact with the exposed copy sheet.

In an attempt to meet the desired objectives, developer systems have been proposed whereby the copy paper is immersed in a fluid developer as the copy paper passes through the copying apparatus, during which time the developer fluid itself is agitated. Although this type of apparatus can produce copies of high quality, it has suffered from the disadvantage in that the copy paper itself is wetted to such a degree that an additional drying step of some type is required. This excessive wetting of the paper not only may cause the paper to curl upon leaving the apparatus, but the excess developer on the back side of the paper produces unattractive copies and stains the hands of the machine operator.

Furthermore, attempts to solve the problem, which includes the use of a pair of resiliently loaded cylindrical rollers to squeeze the excessive fluid from the copy sheet, results in the additional disadvantage that such a large force is required between the squeezing rollers that the image is often impressed upon the rollers themselves, which image is then in turn transferred back to the same or a following copy sheet, thus creating an unattractive and sometimes illegible copy. The copy paper in some cases will even tend to curl due to the excessive force. Also, it has been conventional to mount these cylindrical rollers to rotate about spaced parallel shafts, the rollers being loaded at their respective ends in a direction toward each other. Although these types of rollers have been effective in some applications, they have not been entirely satisfactory under all conditions for the reason that if the rollers are of sufficient length and are loaded to a sufficient degree, the rollers will tend to bow and can become significantly separated at their centers, thus preventing the rollers from being entirely effective in removing the excess developer.

An even further area in which difficulty has been encountered in this combination viewer-copier apparatus is in the dual purpose optical system required for projection of the image to the viewer screen as well as to the exposure position. To accomplish this objective, various systems have been proposed in which one or more moveable optical elements are provided to selectively project the image either to the viewing screen or to the exposure position. Although these types of optical systems have served the purpose, they have not proved entirely satisfactory under all conditions of service due to the difficulty encountered in causing the moveable optical element or elements to return to exactly the same position, thus causing the image to be out-of-focus or displaced in either one or both of the viewing and exposure positions. Even when attempts have been made to simultaneously project the image at both the viewing and printing stations without moveable elements, difficulties have been encountered in preventing the transmission of ambient light into the interior of the apparatus through the viewing screen and to the exposure station, thus deleteriously affecting the latent image produced on the paper itself at the exposure station.

The general purpose of this invention is to provide an improved viewer-copier apparatus which embraces all the advantages of the similarly employed prior art devices and possesses none of the aforedescribed disadvantages. To obtain this, the present invention contemplates the use of an improved arrangement in the sheet feeding and handling apparatus, developer applicator apparatus, paper hold-down apparatus, and optical system whereby to above disadvantages are avoided.

OBJECTS OF THE INVENTION

An object of the present invention is the provision of an improved viewer-copier apparatus.

Another object of the present invention is the provision of an improved viewer-copier apparatus for use with microfiche.

A further object to the present invention is the provision of an improved viewer-copier apparatus for use in making enlarged electrostatic type reproductions.

Still another object of the present invention is the provision of an improved viewer-copier which is compact in size.

A still further object of the present invention is the provision of an improved viewer-copier apparatus which produces reproductions of good quality.

Another object of the present invention is the provision of an improved viewer-copier apparatus which produces electrostatic prints of good quality.

A still further object of the present invention is the provision of an improved copier apparatus which has an improved sheet feeding means therein.

Yet another object of the present invention is the provision of an improved feeding means for a copier apparatus which feeds individual sheets of material from a stack of a plurality of sheets.

Another object of the present invention is the provision of an improved viewer-copier apparatus which substantially prevents light entering the apparatus through the viewer screen from reaching the charged sheets of copy material.

Still another object of the present invention is the provision of an improved sheet developer apparatus for an electrostatic copier apparatus.

Yet another object of the present invention is the provision of an improved viewer-copier apparatus which is simple and inexpensive to manufacture and maintain.

Other objects and many of the attendant advantages of this invention will be readily appreciated by those of ordinary skill in the art as the same become better understood by reference to the following detailed description when considered in connection with the accompanying drawings in which:

DETAILED DESCRIPTION OF THE PREFERRED EMBODIMENT

Figure 1:
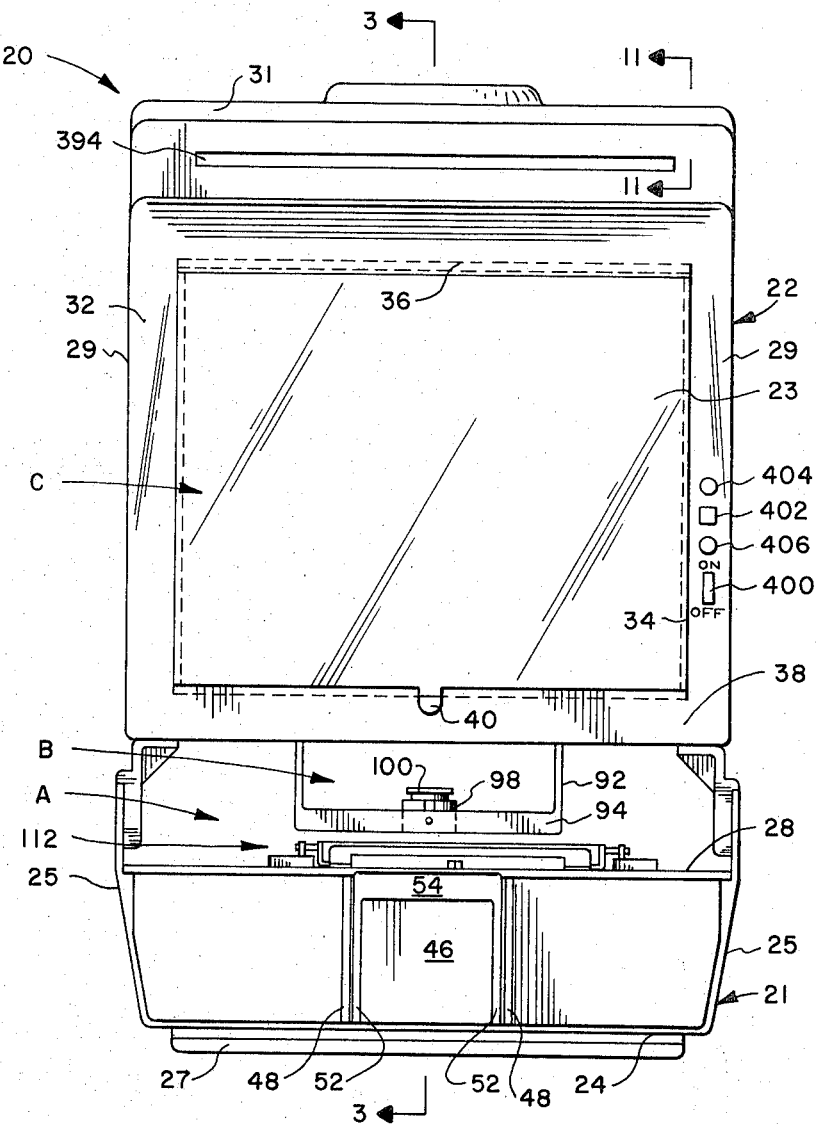
FIG. 1 illustrates a front elevation view of a preferred embodiment of the viewer-copier apparatus of the present invention.

Referring now to the drawings, wherein like reference characters designate like or corresponding parts throughout the several views, there is shown in FIG. 1 one embodiment of the improved viewer-copier apparatus which for purposes of the description is generally designated by reference numeral 20. Throughout the following description, the front of the apparatus (see FIG. 1) is regarded as that portion which the operator faces while placing a microfiche film in the machine for reproduction and upon which the several manual operating controls are located. The apparatus 20 is illustrated in FIG. 1 in a position resting on a table or desk top. While, for purposes of description, the apparatus 20 is shown as having a case or outer enclosure of a particular shape for housing the various component parts, the details of which will subsequently be described, it is obvious, of course, that the particular shape is only illustrative, and the housing could be constructed in other shapes as dictated by the materials and preference of the designer.

Figure 3:
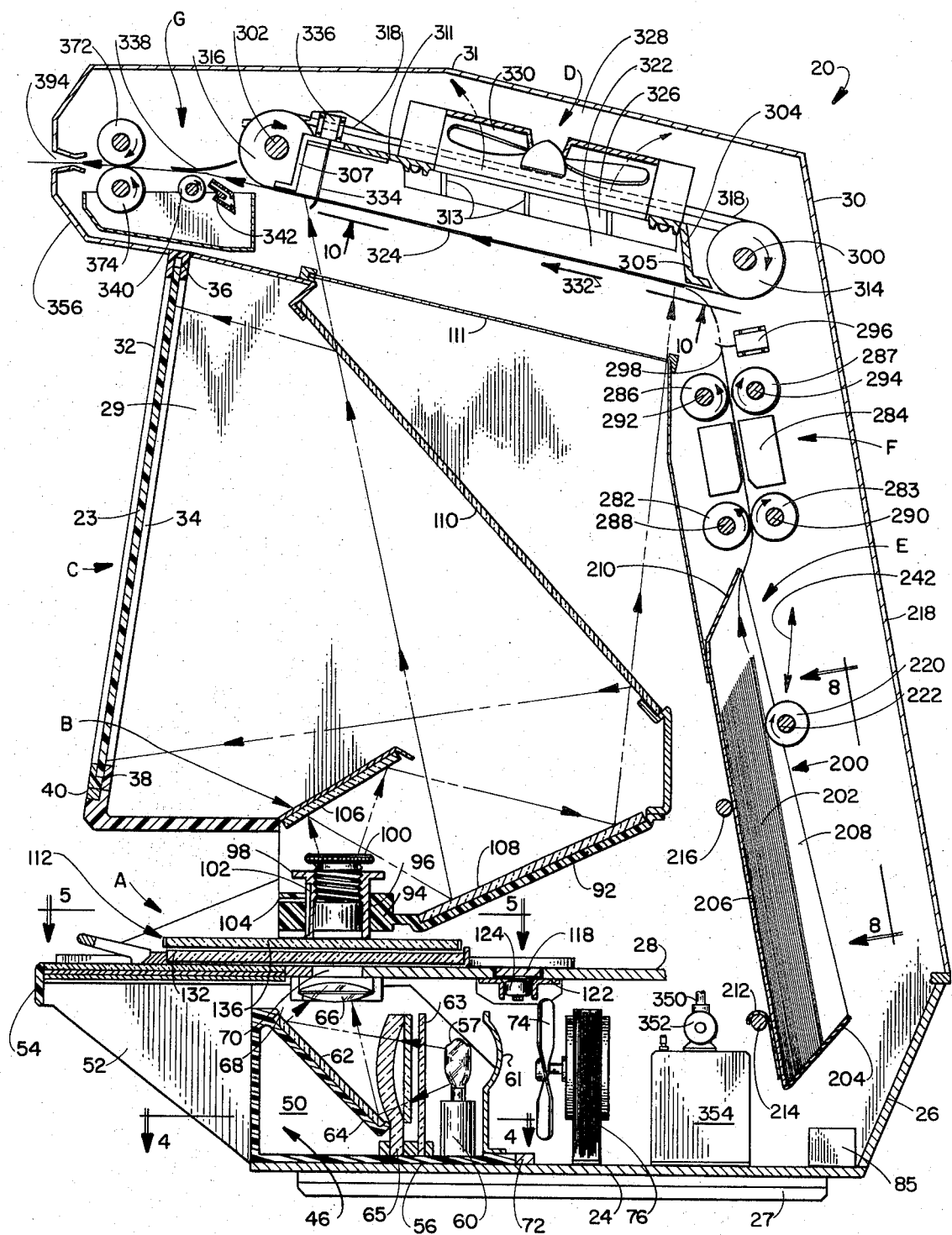
FIG. 3 illustrates a section of the device taken on line 3—3 of FIG. 1, looking in the direction of the arrows, showing the optical path and the various apparatus for handling the copy sheets.

The viewer-copier apparatus 20 of the present invention is of the type which cannot only transform and project the image on microfilm to one viewable by the unaided eye, but can also reproduce or print that image "hard copy" format. Accordingly, as can be seen in FIGS. 1 and 3, the viewer-copier apparatus 20 of the present invention includes a portion A for holding a microfiche film and selecting a particular image thereof, an optical assembly B for projecting an image from the microfiche film onto a viewing portion C, and an exposure station D where previously treated sheets of copy paper are exposed to the generated image which is to be copied. The apparatus additionally has a paper storage portion E from which individual sheets are fed through an electrostatic charging portion F and to the exposure station D. Thereafter, the so exposed copy paper is transported from the exposure station D to developer apparatus G and is then ejected from the apparatus 20 as a complete enlarged hard copy print-out of the selected microimage.

Figure 2:
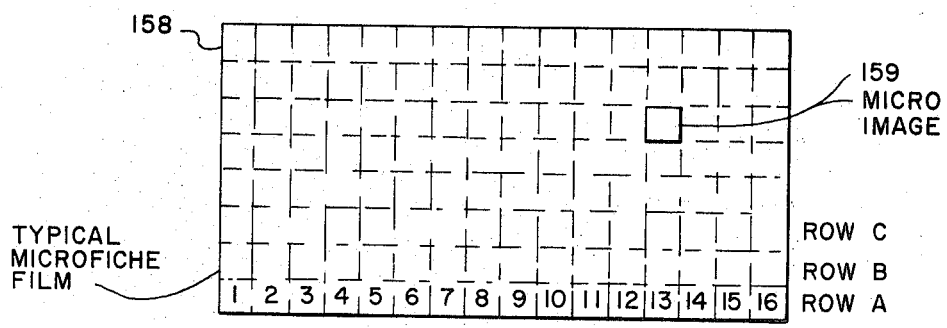
FIG. 2 illustrates a plan view of a typical microfiche film.

In this manner, the apparatus function is not only as a microfilm or microimage viewer but also as a microfilm copier or printer. A typical example of a microfilm which can be utilized in conjunction with the apparatus 20 is illustrated in FIG. 2 as a microfiche 158 having a plurality of microimages 159 disposed thereon and aligned in a plurality of identifiable rows and columns.

The apparatus 20 of the present invention preferrably utilizes in the copying or printing portion thereof what is sometimes referred to as "a negative reversal electrostatic process". In accordance with this process, the microfiche film 158 includes a negative image 159 of the document to be copied, the microfiche being placed in the film holding apparatus A. The copy paper with the photosensitive coating on one side thereof in the storage portion E is transported, upon command, through the charging apparatus F where it is given a negative charge. The paper is thereafter moved to the exposure station D, and light transmitted through the microimage 159 on the microfiche film by the optical means B onto the negatively charged photosensitive coating of the copy paper produces an enlarged latent image thereon corresponding to the microimage 159. This latent image will be in the form of discharged portions of the photosensitive coating defined by the areas where the light contacts the paper. Thus it can be seen that due to the fact that a negative microfiche image is used, the light will contact the coating of the paper in the areas where the character or image is to be printed. The paper is then moved through a development portion G where the coating on the paper is placed in contact with a developing fluid containing an abundance of negative ions with dark color pigment. The negatively charged color pigments will collect on the photosensitive coating of the paper in the area where the charge has been removed by the incident light during the exposure process. Thereafter the copy sheet is advanced from the developer station and excess developer fluid removed from the copy sheet, whereupon a completed copy is obtained. It should be noted, however, that other types of electrostatic copying processes well known in the art could be utilized in accordance with the apparatus of the present invention, such as a positive reversal technique.

Turning now in detail to FIGS. 1 and 3, it can be seen that the apparatus 20 comprises a base housing 21 containing the illumination and optical system, an upper housing 22 in which a rear projection type viewing screen 23 is mounted and the paper storage portion E, charging portion F, exposure portion D, and developing portion G are located. The base housing 21 has a bottom panel 24, side walls 25 and rear wall 26 and rests on a swivel base 27 secured below the bottom panel 24. The top of the base housing 21 is closed by a flat table 28 which extends forward of the upper housing and is the full width of the base between the side walls 25. Upper housing 22 has side walls 29, a back wall 30, top panel 31 and a front frame 32 for holding the viewing screen 23, which screen is inclined rearwardly from the vertical for convenient viewing. Frame 32 has inwardly projecting side flanges 34 against which the screen 23 rests, the upper edge of the screen fitting into a channel 36 in the top of the frame and the lower edge of the screen fitting in a lower channel 38. In the lower center portion of the frame 32, a notch 40 for opening is located, for allowing a suitable tool or the like to be inserted to lift and remove the screen. Upper channel 36 has sufficient depth to allow the lower edge of the screen 23 to be lifted clear of lower channel 38, so that the screen can be removed for cleaning internal elements. The upper housing 22 is supported in fixed space relation above table 28 by suitable upward extensions of the side walls 29. Preferably, the screen 23 is of the type that has a low transmission factor.

In the central forward portions of the base housing 21, below table 28, is a lamp housing assembly 46 in the form of a drawer element with sides 50 which slide between intermediate walls 48 and the housing. For convenience of removal and replacement, the sides 50 of lamp unit 46 have forwardly extending portions 52 which are joined by a cross bar 54, which bar fits along the lower edge of table 28 to form a handle for the lamp housing. At the rear of lamp unit 46 is a floor panel 56 on which is mounted a projection lamp 58 in a suitable holder or socket 60. Rearward of the lamp 58 is a reflector 61 fixed on panel 56 for reflecting the light in a forward direction. Forward of lamp 58 is a heat filter 63 and collector lens 65 fixed on panel 56. An inclined cold mirror 62 is fixed on a bracket 64 to direct light from the collector lens 65 upwardly through a condenser lens 66, held in a mounting 68 at the bottom of the table 28, in alignment with the aperture 70. Table 28 has an aperture 70 disposed immediately above condenser lens 66. A fixed stop 72 is provided for locating the lamp unit 46 in such a manner that the condenser lens 66 is optically aligned with the lamp unit 46. In the middle portion of the base mounting 21, approximately in line with the projection lamp 58 is a cooling fan 74 driven by a motor 76. Cooling air is drawn through openings (not shown) in the bottom panel 24 and exhausted therethrough.

Figure 4:
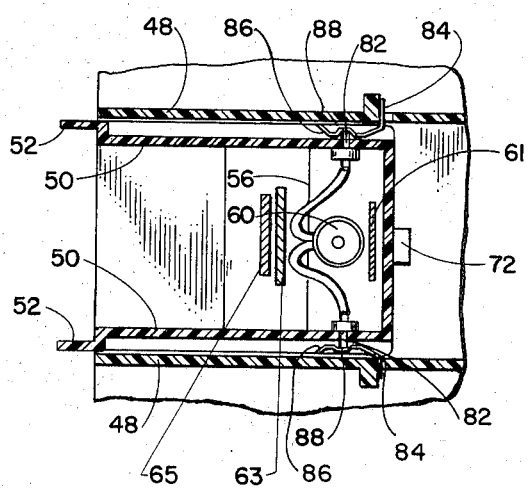
FIG. 4 illustrates a partial section of the device taken on line 4—4 of FIG. 3, looking in the direction of the arrows, showing the position of the lamp unit.
Figure 7:
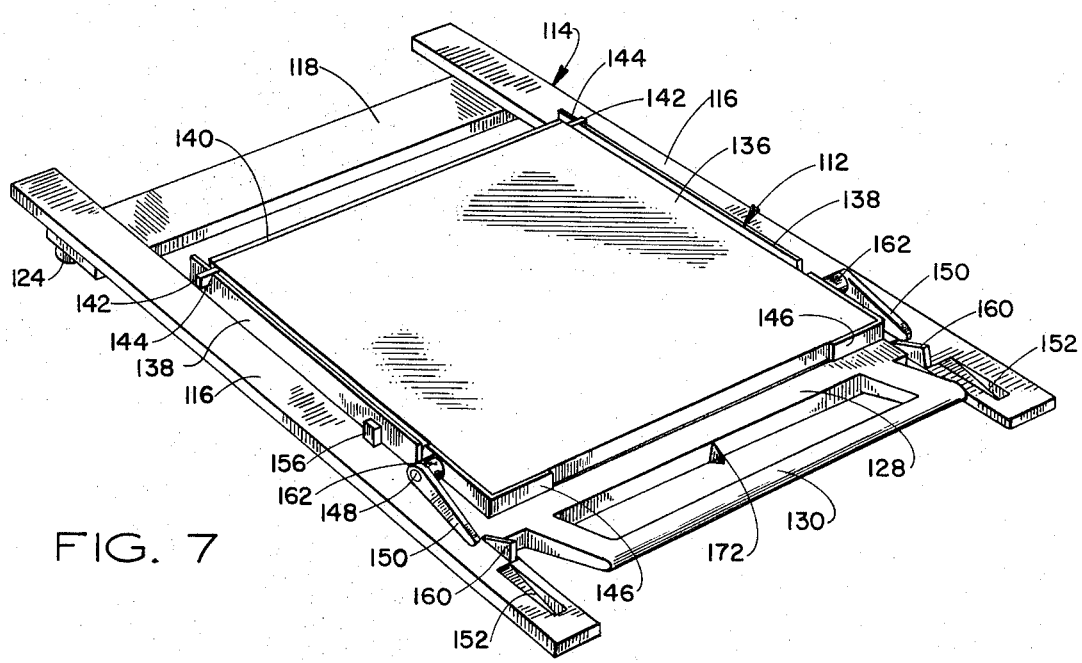
FIG. 7 illustrates a perspective view of the film holder.
Figure 5:
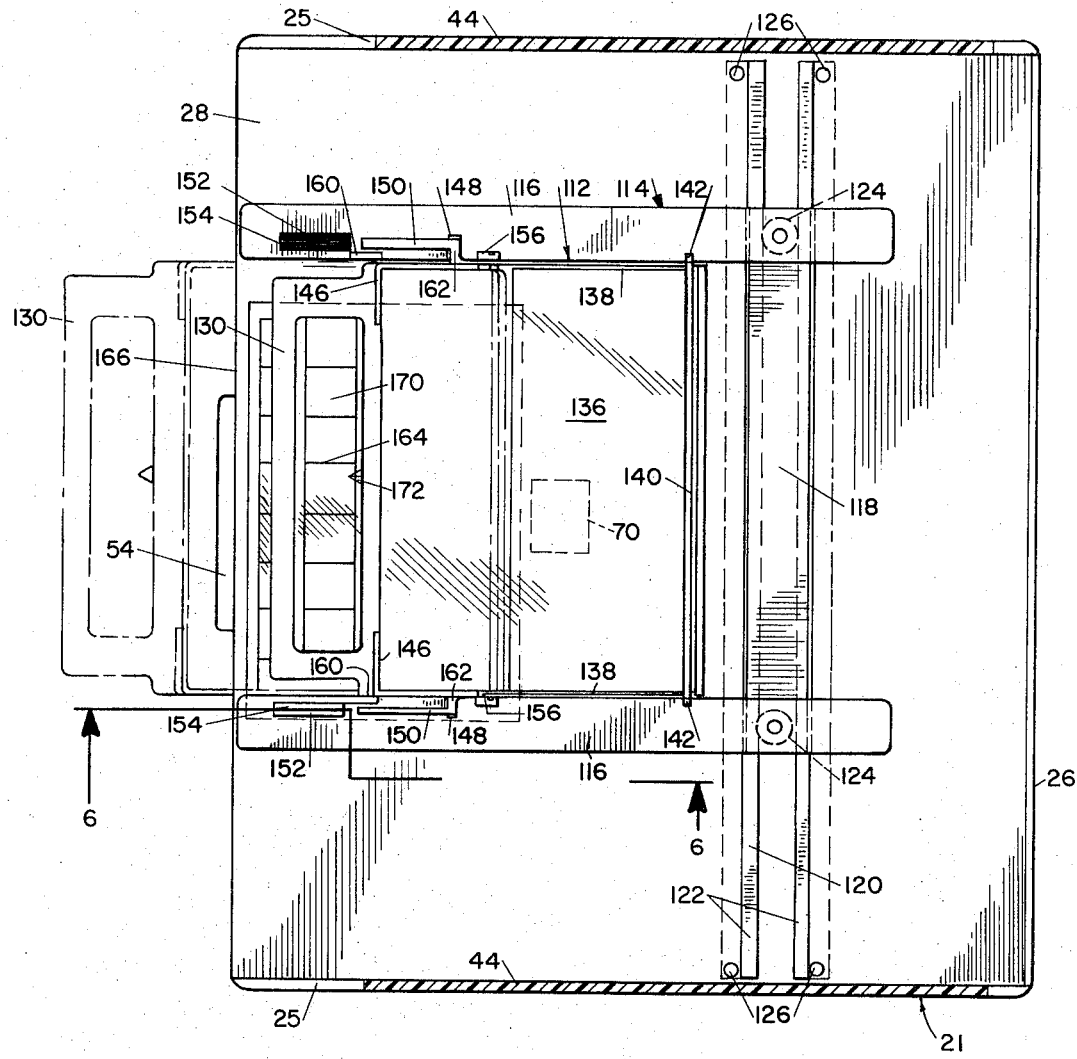
FIG. 5 illustrates a partial section of the device taken on line 5—5 of FIG. 3, looking in the direction of the arrows, showing the film holder in detail.
Figure 6:
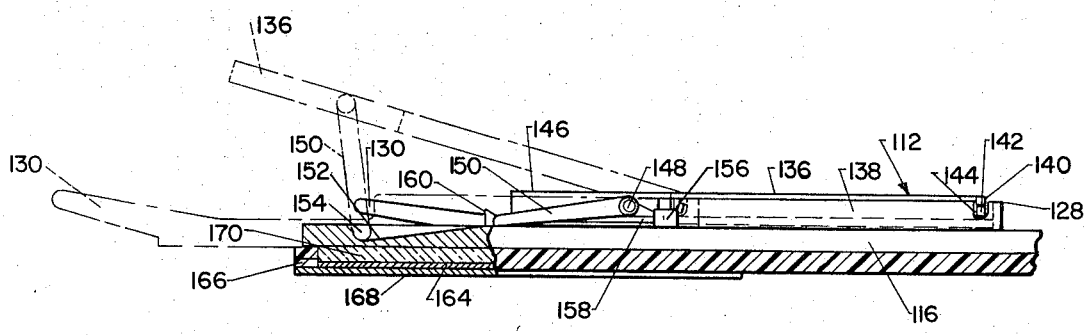
FIG. 6 illustrates a partial sectional view of the device taken on line 6—6 of FIG. 5 looking in the direction of the arrows.
Figure 13:
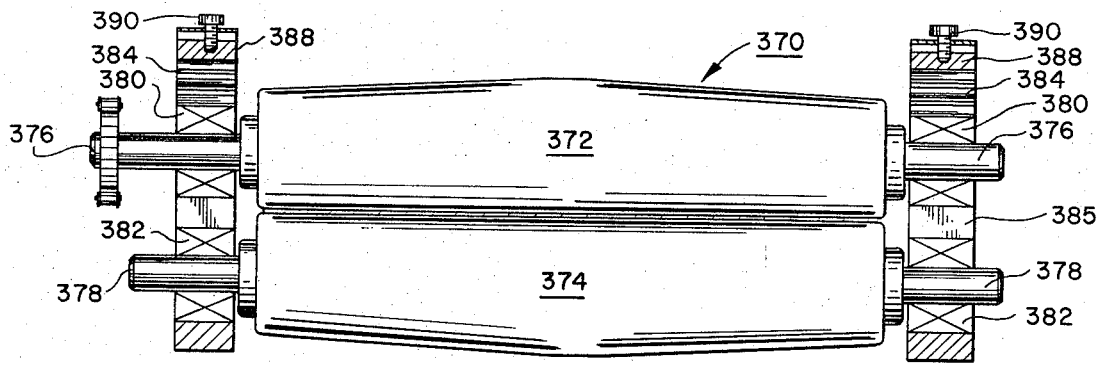
FIG. 13 illustrates a partial sectional view of the squeegee roller assembly at the developer station taken on line 13—13 of FIG. 11, looking in the direction of the arrows.

As shown in detail in FIG. 4, for ease in maintenance, the electrical wires from socket 60 lead from electrical contacts 82 fixed in and projecting from the sides 50 on opposite sides of the lamp unit. These contacts 82 engage electrical contacts 84 mounted on posts disposed on bottom panel 24, which are connected to a control means 85 by conventional circuitry, not shown. Each contact 84 has a forward ramp 86 and a recess portion 88 to receive the associated contact 82, so that the lamp unit snaps into place and is readily removable.

Returning to FIGS. 1 through 3, it can be seen that the upper housing 22 has a downwardly extending mounting frame 92 having a transverse bar member 94 spaced above aperture 70 and parallel to table 28. In the center of bar member 94 is a cylindrical vertical bore 96, coaxial with the center of aperture 70. Mounted in the bore 96 is a vertically slidable sleeve 98 which has a threaded bore into which the adjustable projection lens 100 is threaded. The sleeve 98 has a longitudinal groove 102 for receiving a retaining projection 104 fixed in the bar member 94 to prevent rotation of the sleeve. As subsequently described, the specific microimage element 159 of the microfiche which is to be viewed and/or printed is aligned over the aperture 70, which in turn is axially aligned with the lens assembly 100.

Above lens 100 is an inclined first mirror 106 suitably mounted to direct the image formed by projecting light through the aperture 70 and the microfiche element to a second mirror 108, which directs the image upwardly toward a third mirror 110. The mirrors 62, 106, and 108 are preferably coated with a material, such as a metallic substance, which tends to minimize the polarization of the light reflected therefrom. The so-reflected image impinges on the forward side of the planar mirror 110 where it thereafter is directed toward the screen 23 for viewing, as well as to the exposure station D for copying, all as indicated by the direction of the arrows illustrated in FIG. 3. To accomplish this objective, the mirror 110 has a multi-layer di-electric coating on its forward face which is partially transmissive and partially reflective, the back side of the mirror being coated with a high efficiency anti-reflective coating to reduce reflections therefrom. Consequently, the image generated to the mirror 110 is caused to impinge not only on the screen 23, but also upon copy paper disposed at the exposure station D.

In accordance with a specific unique feature of the apparatus of the invention, additional means are provided, in combination with the mirror 110 for effectively preventing ambient light entering through the screen 23 from reaching the exposure station D. To effect this objective, the apparatus of the present invention advantageously utilizes the optical characteristics of the mirror 110 in combination with the optical characteristics of a slat rectangular shaped polarizing element 111, the element 111 being so mounted that it intercepts the light which is transmitted through the mirror 110 toward the exposure station D.

The mirror 110 has a multi-layer di-electric beam splitting coating which relects, for example, approximately 60 percent and transmits approximately 40 percent of the light incident thereon at an angle of incidence of approximately 45°. In addition, light which is both reflected from and transmitted through this mirror is polarized with the degree of polarization dependent upon the angle at which the light energy is incident upon its surface. Thus, by mounting the mirror 110 at a controlled angle, as subsequently described; by disposing the polarizing element 111 between the mirror 110 and the exposure station D, and orienting this polarizing element with respect to the mirror 110 so that it blocks that light received therefrom which is of maximum polarization, the combination of mirror 110 and element 111 can be utilized to substantially block ambient light transmitted through the mirror 110, while allowing the light energy received from the mirror 108 (image light) to reach the copy paper at the exposure station.

Specifically, it has been found that the minimum degree of polarization for the mirror 110 occurs at angles of light incidence near 45°, and the degree of polarization increases to a maximum for angles of light incidence approaching 0° or 90°. Thus, in accordance with a preferred form of construction of the optical elements, depicted in FIG. 3, the mirror 110 was disposed at an angle with respect to the screen 23 so that the ambient light principal ray striking the surface of the mirror 110 had an angle of incidence of approximately 90° while the principal ray representing the light image received from the mirror 108 had an angle of incidence of approximately 45° (specifically, 48° 15'). To achieve this latter angle, the principal ray coming from lamp 58 strikes mirror 62 at an angle of incidence of approximately 45°, reflects and strikes mirror 106 at an angle of incidence of 55° 30', and strikes mirror 108 at an angle of incidence of approximately 48° 30'.

Thus, since the image light energy transmitted through the mirror 110 is polarized to a minimum degree, while the ambient light energy transmitted through the mirror 110 is polarized to a maximum degree, and the so polarized ambient light is effectively blocked by the properly oriented polarizer element 111, this ambient light is prevented from interfering with the image which is projected to the exposure station.

As illustrated in FIGS. 3, 5, 6 and 7, a film holder 112 for holding the microfiche slides on the top surface of table 28 and is guided by a carrier 114. The carrier comprises a pair of spaced parallel guide bars 116 connected at the rear by a crossbar 118 in a genuinely Ushaped frame, the crossbar sliding in a slot 120 extending transversely across the table 28 with the guidebars resting on the table. To insure accurate tracking, a pair of rails 122 are secured below table 28 forming a track below and coextensive with slot 120 with rollers 124 mounted under each end of crossbar 118 to ride between the rails. One or both rails 122 may be made adjustable such as by elongating the holes or attachment of screws 126 or other attachment means, so that clearance for the rollers 124 can be minimized and play in the carriage effectively eliminated. Film holder 112 has a rectangular frame 128 which is a close sliding fit between guidebars 116, with handle 130 extending from the forward end of the frame for ease in manipulation. Within the frame 128 is a lower glass plate 132 which is supported on an internal flange of the frame just clear of table 28. An upper glass plate 136 of similar size fits on top of lower plate 132, the frame having raised sides 138 which align the upper plate. Fixed to the rear edge of the upper plate 136 is a guidebar 140, at opposite ends of which are outwardly extending hinge pins 142, which rest in notches 144 in the sides 138. Upper plate 136 can swing upwardly about the hinge pins, or be lifted from their frame to facilitate cleaning. The upper plate extends forward of the raised sides 138 and fixed to the front corners of the upper plate are corner brackets 146. Each corner bracket has an outwardly projecting pin 148 on which is disposed a pivotably lifting lever 150, these levers extend forward and rest on guidebars 116. Located at the forward end projections of guidebar 116 are downwardly inclined ramp sockets 152 which are longitudinally aligned with levers 150. When holder 112 is pulled forward, the levers slide down into the ramp sockets until they reach the stop places 154 at the forward end of the sockets. Continued pulling on handle 130 then causes the front end of the upper plate 136 to be raised by the pivoting action of the levers, as in broken line position shown in FIG. 6. To limit the forward motion of the holder, the guidebars 116 have fixed stops 156 which engage the projecting hinge pins 142, with the levers 150 slightly beyond vertical so that the upper plate is held open. This facilitates removal or insertion of the microfiche 158 between the plates of the holder. Initial opening of the holder is assisted by upwardly and forwardly inclining ramps 160 on guideboards 116, immediately rearwardly and inwardly of ramp socket 152. The hub portions 162 of levers 150 ride up ramp 160 as the levers approach stop phases 154 and thus avoid any abrupt resistance to the forward pulling action.

Precise focus is maintained by allowing the sleeve 98 of the projection lens to ride on the top surface of upper plate 136. Once the focus is adjusted, the lens is thus held at the correct distance from the film plane as the film holder is moved. It is, of course, necessary for the upper plate 136 to be of good quality, planar glass in order to hold the focus.

As earlier described, the microfiche film 158 is normally composed of a plurality of individual frames or microimages 159 of constant dimension arranged in rows and columns, each frame adapted for individual positioning under the projection lens 100. To aid in locating each frame as required, a guidechart 164 (FIG. 5) with divisions corresponding to the microfiche frames, is used. The forward portion of table 28 has a shallow cavity shown as a rectangular opening 166 with a bottom closure plate 168 secured under the table. Guide chart 164 is placed in the opening and held by a transparent cover plate 170, flush with the upper surface of the table. On the forward edge of frame 128 is a pointer 172, positioned so that when the pointer is over a particular frame of the guide chart, the corresponding microfiche frame is in a projection position. Selected frames can thus be quickly located in various microfiche arrangements and can be located by inserting the appropriate guide chart.

Although the preceding description discloses the use of a film holding apparatus which is adapted for handling microfiche-type films, it is deemed apparent that the principles of the apparatus as disclosed herein could be utilized for viewing and copying other types of film by appropriately altering the film handling apparatus.

Referring now to FIGS. 1, 3, 8, 9, 10, 11, 12, and 13, the details of the copier portion of the apparatus 20 will be described. Adjacent the rear of the apparatus 20 is a paper tray 200 in which a stack 202 containing a plurality of sheets of copy paper can be stored. These sheets of copy paper have an appropriate photosensitive conductive coating on one side thereof, and are placed in the tray with the so-coated side facing down and to the front.

In accordance with a specific feature of the invention, the tray 200 (FIGS. 3 and 8) is constructed with a bottom wall 204, which extends from and is attached to a front wall 206; a pair of side walls 208; and an upper deflector wall 210, the walls of the tray preferably formed of electrically conductive material. The front wall 206 and bottom wall 204 are joined at an acute angle so that the cross-section of the stack of the paper contained in the tray will assume a parallelogram shape. The inside surfaces of the walls 204, 206, and 208 adjacent the stack 202 are coated or covered with ain insulating material so that the stack is electrically insulated from the tray 200 itself. The upward deflector wall 210, on the contrary, remains uncoated with an insulating material and, in fact, can be coated on its inside surface with a high conductivity material, such as chrome, to further improve the electrical contact between the paper and the deflector wall 210.

As can be seen in FIG. 3, the paper while stored in the stack 202, is normally not in contact with the upper deflector wall 210. Paper tray 200 is supported in the apparatus 20 by means of a mounting hook 212 fastened to the exterior side of the front wall 206, which engages a hanger rod 214, while the rear of the front wall 206 rests against a second hanger rod 216. In this manner the paper tray 200 is removably mounted in the apparatus 20 so that tray 200 can be removed and filled with copy paper. An access door 218 provided in the back wall 30 can be mounted with suitable hinging and locking means to prevent the entrance of light into the apparatus when the door is in the closed position. By utilizing this door 218, access can be gained to the paper tray 200, with the access door being of a size to allow the removal of the paper tray 200 therethrough.

It also should be pointed out that hanger rods 214 and 216 are electrically grounded in the apparatus and the mounting hook 212 constructed from conductive material so that the upper deflector wall 210 (and walls 204, 206, and 208) are electrically grounded through said hanger rods 214 and 216.

A paper feed apparatus is located adjacent to paper tray 200 to transport individual sheets of copy paper from the paper tray 200 to the paper charging apparatus F mounted just above the paper tray 200. This feed apparatus comprises a pair of friction engaging wheels 220 which can be seen in FIGS. 3 and 8 as being supported on and fixed to rotate with the shaft 222. As will be hereinafter described, the shaft 222 and friction wheels 220 can be selectively driven in a clockwise direction as seen in FIG. 3 and urged in a direction to contact the surface of the upper sheet of copy paper in the stack 202. Thus, when it is desired to feed a sheet of copy paper from the stack 202, the rotating friction wheels 220 which so engage the stack, force the top sheet thereof in a direction toward the upper deflector wall 210. This deflector wall 210 is multipurpose in that it not only bends and directs the transported sheet in a direction toward the charging apparatus F, but also contacts the conductive underside of the sheet material, and due to its conductive nature, serves to discharge any electrostatic charge either carried by the sheet material itself or transferred through the sheet material after the sheet material is in contact with the charging apparatus F. This discharging function is particularly important since the charging apparatus is so disposed with respect to the tray 200 that copy paper being transported through the copy cycle will be in simultaneous engagement with the tray stack and the charging apparatus. The deflector 210 also provides the additional function of applying a frictional force to any adjacent sheet or sheets of copy paper which may adhere to the sheet being selectively fed from the stack as well as also grounding these adjacent sheets to further reduce sticking and double feeding of the sheets of copy material due to frictional and electrostatic forces which may exist between the adjacent sheets.

Figure 8:
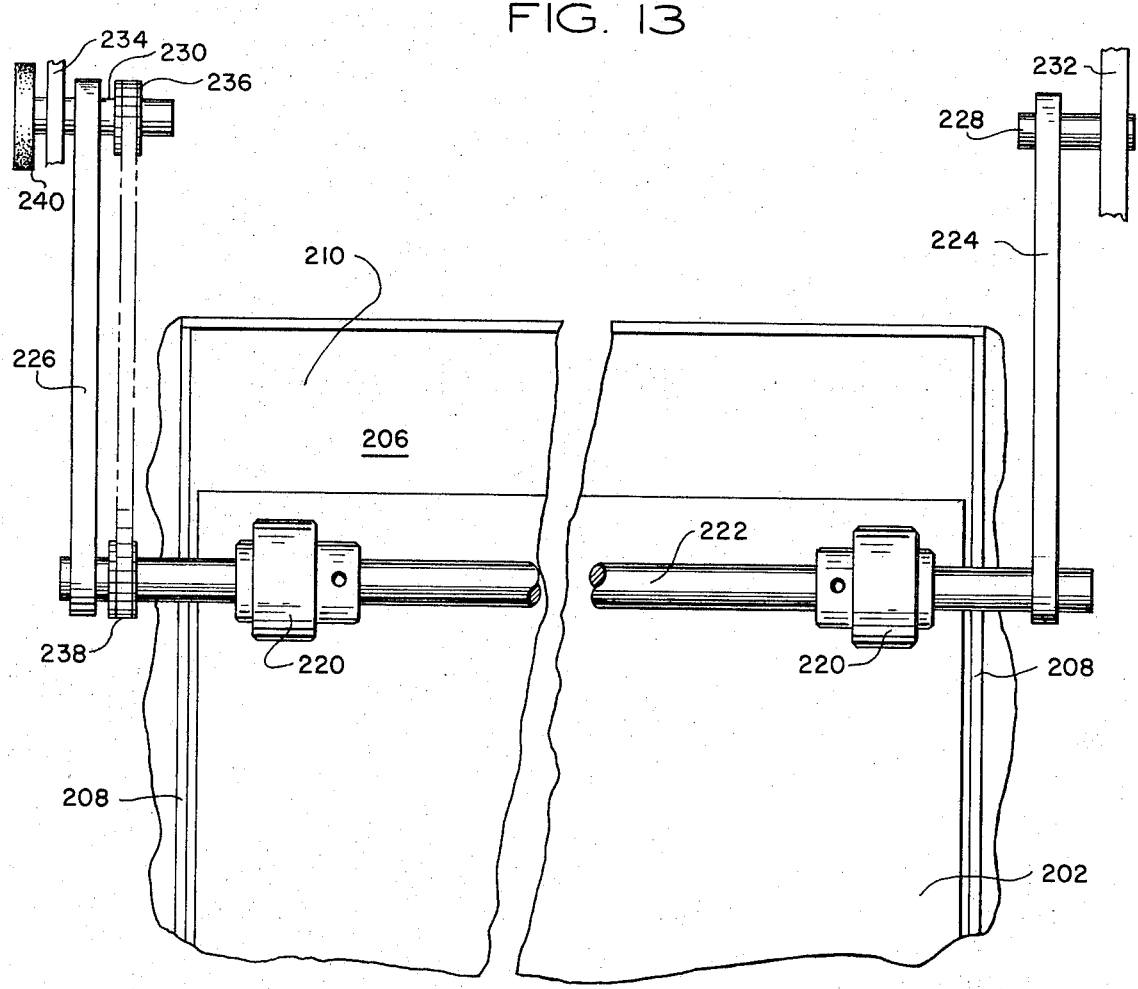
FIG. 8 illustrates a fragmented view of a portion of the apparatus looking in the direction of the arrows represented by 8—8, showing the copy paper tray and feed rollers.
Figure 9:
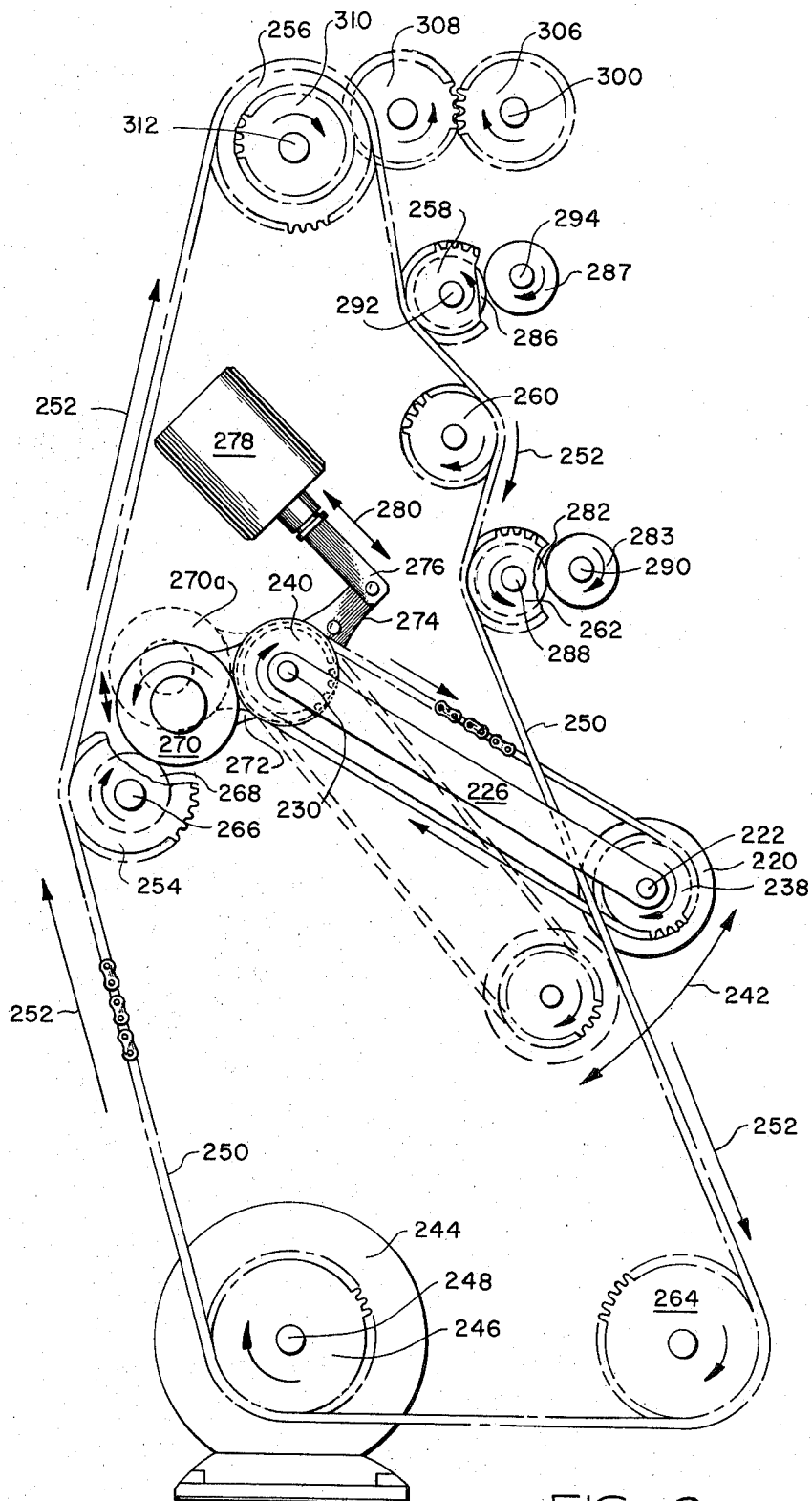
FIG. 9 illustrates a diagrammatic view of a portion of the apparatus, showing the drive mechanism thereof.
Figure 10:
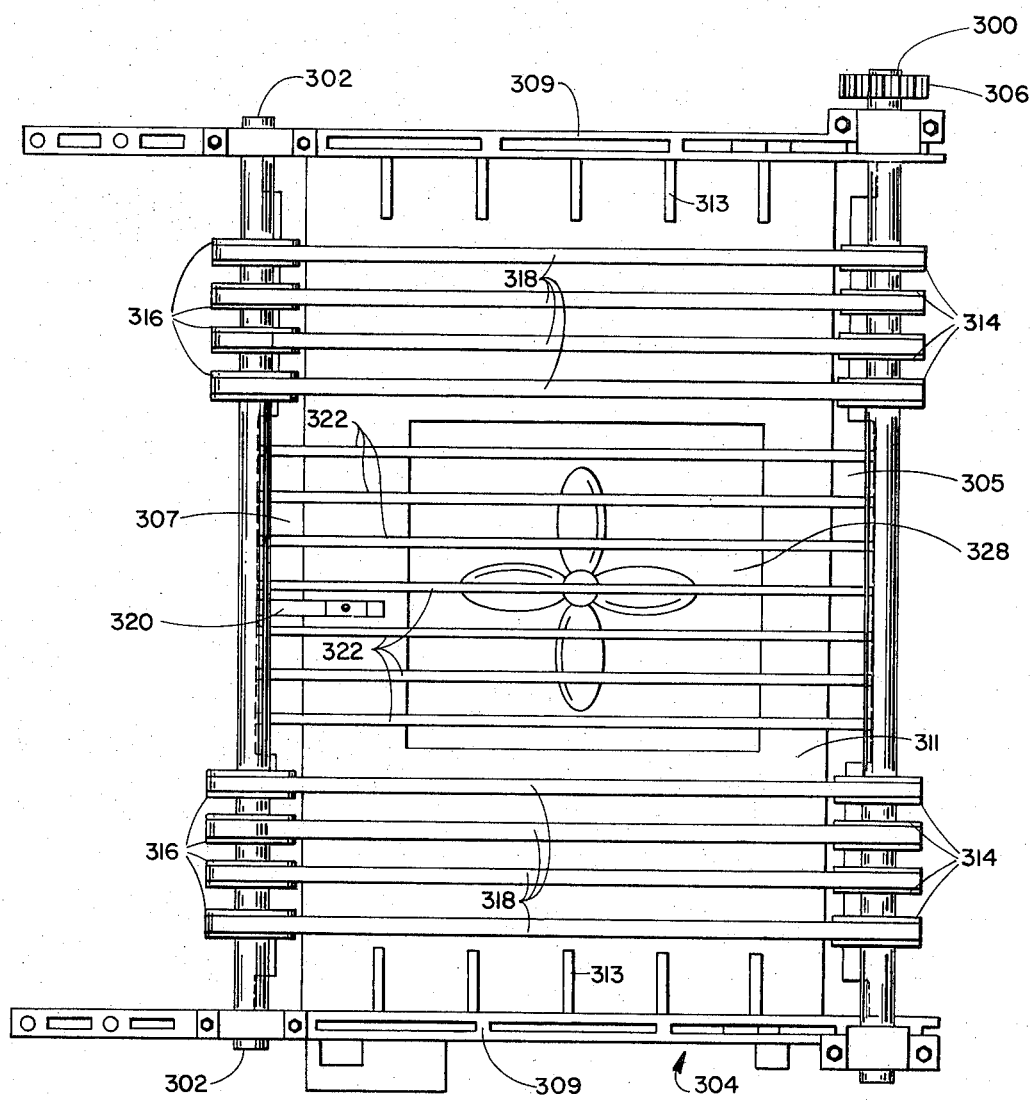
FIG. 10 illustrates a view in the direction of the arrows 10—10 of FIG. 3, showing the underside of the exposure apparatus.

The means for selectively driving friction wheels 220 and shaft 222 is illustrated in FIGS. 8 and 9. The ends of the shaft 222 are rotatably mounted by suitable means such as bearings on swinging arms 224 and 226. These swinging arms 224 and 226 are in turn mounted to rotate about coaxial shafts 228 and 230 respectively. The shaft 228 is in turn rotatably supported from a frame member 232 attached to the interior of the apparatus 20 and extending parallel to the side walls 25. The shaft 230 is likewise rotatably mounted and supported from a frame member 234 which is fixed within the apparatus 20 in a position parallel to the side walls 25. A sprocket member 236 is also attached to the shaft 230 on the side of the swinging arm 226 opposite the frame member 234. This sprocket member 236 is fixed to rotate with the shaft 230 and is provided with suitable means for engaging an endless chain or belt as will hereinafter be described. Another sprocket member 238 is attached to rotate with the shaft 222 and is aligned in a parallel relationship with sprocket 236. This sprocket 238 is of similar configuration with the sprocket 236 so that the two sprockets can operate together to engage an endless chain or belt so that shaft 222 is mechanically connected to and rotatably driven by shaft 230. Also attached to shaft 230 on the opposite side of the frame member 234 from the swinging arm 236 is a friction gear 240, the function and operation of which will be hereinafter described. From the foregoing it can be seen that the swinging arms 224 and 226 will carry the shaft 222 and friction wheels 220 and will rotate respectively about shafts 228 and 230 in the direction of arrow 242 shown in FIGS. 3 and 9 between the positions shown in solid lines and in phantom lines in FIG. 9. It also can be seen that due to the offset of the shafts 228 and 230 from the friction wheels 220, the force of gravity will keep the friction wheels in contact with the upper sheet of the stack 202. This allows the apparatus to contact and feed the top sheet from the stack 202 as the number of sheets in the stack varies.

Referring here to FIG. 9, it can be seen that the drive mechanism of the apparatus 20 comprises a motor 244 which is selectively controlled by control means 85. This motor drives the sprocket 246 attached to its output shaft 248 in a clockwise direction as shown in FIG. 9 to move the endless chain or belt 250 in the direction of the arrows 252 shown in FIG. 9. This endless chain or belt 250 engages a plurality of sprockets 254, 256, 258, 260, 262, and 264 so that the motor 244 drives the above sprockets in the direction shown by the respective arrows thereon in FIG. 9. The sprocket 254 is mounted to rotate about a shaft 266 along with friction gear 268 which is selectively engaged by a movable friction idler gear 270. This idler gear 270 is rotatably mounted by a bracket 272 which is in turn mounted to rotate about shaft 230. This movable bracket 272 has an extending arm 274 to which is pivotably attached the output plunger 276 of a solenoid 278. This solenoid 278 is electrically operatable to selectively move the output plunger 276 in the direction of arrows 280 in FIG. 9 thus moving the idler gear 270 from the position shown in solid line to the position 270a shown in dotted line in FIG. 9. It is to be noted that as the idler gear 270 is moved by the action of the solenoid 278, the gear 270 will remain continuously in contact with the friction gear 240 and will selectively engage the friction gear 268. In this manner the idler gear 270 is selectively driven by the continuously running or moving gear 268. It also can be seen that when it is desired to feed a sheet of copy material from the stack 202 that the idler gear 270 is moved into contact with gear 268 which in turn drives gear 240 which in turn drives shaft 230 which in turn drives shaft 222 and which in turn drives friction wheels 220 against the surface of the upper sheet of paper contained in the stack 202. Once the sheet is fed a sufficient distance, the solenoid 278 can move the idler gear 270 away from friction gear 268 to disengage the apparatus and discontinue the feeding operation.

After the individual sheets of paper have been fed from the stack 202, they enter the charging apparatus F. This charging apparatus F comprises two coacting entrance feed rollers 282 and 283 which resiliently grip the copy sheets therebetween and convey them to and through a corona housing 284 to a pair of coacting exit feed rollers 286 and 287. The corona housing 284 is provided with a slot through which copy sheets can be directed and, within the housing a corona discharge is produced around a plurality of wires or other electrodes to cause the application of negative electrostatic charge to the conductive coating of each copy sheet conveyed therethrough. The corona discharge may be operated continuously or may be operated in response to the position in which the copy sheet is fed through the apparatus.

The entrance rollers 282 and 283 are mounted on parallel shafts 288 and 290, respectively. These shafts 288 and 290 are resiliently urged by springs, not shown, in a direction toward each other so that the circumference of the feed rollers 282 and 283 will engage in driven contact. By referring to FIG. 9, it can be seen that the sprocket 262 engaged by endless chain 250 is attached to the shaft 288. In this manner the entrance feed rollers 282 are driven by motor 244 through endless chain or belt 250. Rollers 286 and 287 are similarly mounted on shafts 292 and 294, respectively, with sprocket 258 attached to shaft 292 so that the exit roller pair can be driven in a likewise manner by motor 244.

Thus, it can be seen that after the top sheet of the copy material is conveyed from the paper tray 200, it is gripped by the entrance feed rollers 282 and 283 and fed through and charged in the corona housing, and thereafter gripped by the exit feed rollers 286 and 287 and conveyed in a direction away from the charging apparatus F. At this point it is important to note that the feed roller 282 is constructed from a conductive material and is grounded in a manner similar to the paper tray 200 to further reduce the charge on the sheets of copy paper and to thereby prevent sticking of the adjacent sheets of copy paper in the paper tray 200.

Located adjacent the exit from the rollers 286 and 287 is a position switch 296 with a sensing arm 298 which extends into the path of the transported copy paper so that the sensing arm will be engaged by each copy paper exiting from the charging apparatus F. As the sensing arm 298 is so engaged by the advancing paper, the switch 296 can be actuated to control the movement of the solenoid 278 to disengage the idler gear 270 from the friction gear 268 to in turn disengage the paper feed mechanism located in the paper tray 200. Since the entrance and exit roller pairs of the charging apparatus continue to be driven after the paper feed is disengaged, the paper transported through the charging station F will continue to move through the copy cycle, but a new sheet of copy paper is prevented from entering the cycle at this point.

After the charged sheet of copy paper exits from the charging apparatus, it is guided by suitable guide means, not shown, to the exposure station D. The exposure apparatus thereat comprises a vacuum housing 304 having two end walls 305 and 307 (FIG. 10), two side walls 309 and a top wall 311 (FIG. 3) defining a vacuum chamber.

Extending across and between end walls 305 and 307 are a plurality of spaced parallel ribs 322, each rib having an interflow aperture 326 therein, an opening 328 in the top wall 311 providing air flow communication between an exhaust fan 330 and the apertures 326. The fan 330 is mounted on the upper surface of the housing 304 and is effective to pull an air flow along the ribs 322, through the apertures 326, and thereafter through the opening 328.

A plurality of endless belts 318 entend the length of the housing 304 and are so positioned to be spaced on either side of, and parallel with, the ribs 322. The belts 318 are entrained on a plurality of pulleys 314 and 316 mounted on parallel shafts 300 and 302, respectively, the shafts being disposed adjacent end walls 305 and 307, respectively. It is to be noted that a slot plane 324 (FIG. 3), hereinafter referred to as the exposure plane, is defined by coplanar portions of the ribs 322 and the belts 318.

The belts 318 are driven in the direction of arrows 332 (FIG. 3) as a consequence of the rotation of the shaft 300 (and therefore the pulleys 314 and 316) in the clockwise direction as illustrated in FIG. 9. As can be seen by reference to FIG. 9, the clockwise rotation of the shaft 300 is effected by the motor 244, the motor driving the gear 310 mounted on a common shaft 312 with the sprocket 256, the gear 310 driving idler gear 308, which in turn drives gear 306 mounted on the shaft 300.

It thus can be seen that as the sheet of copy material is guided onto the surface of the belts 318, the copy material will be moved across the bottom of the vacuum housing 304 in the direction of the arrow 332 as a consequence of the movement of these belts. It should be noted that the paper will ride not only on the belts 318, but also on the coplanar surface of the ribs 322 and will be held in place thereagainst by the pressure differential created by the fan 330. This movement of the copy sheet will continue until the leading edge of the copy sheet contacts the sensing arm 334 of a position switch 336 disposed at the forward end of the housing 304. As the paper contacts this sensing arm, the switch 336 will be actuated, disengaging the motor 244, and energizing the lamp 58. With the copy paper held rigidly in this stationary position against the exposure plane 324, the microfiche image which is directed by the optical system through the planar element 111, as previously described, will expose the previously charged side of the copy paper, thereby to produce the latent image thereupon corresponding to the projected image. The control means 85 determines the length of time that the lamp 58 is illuminated, thereby controlling the exposure time. Once the exposure of the copy sheet is completed, motor 244 is again energized by control means 85, and the copy sheet is moved further in the direction of arrow 332 until it comes into contact with a deflector plate 338 which directs the paper into the developer station G.

Figure 11:
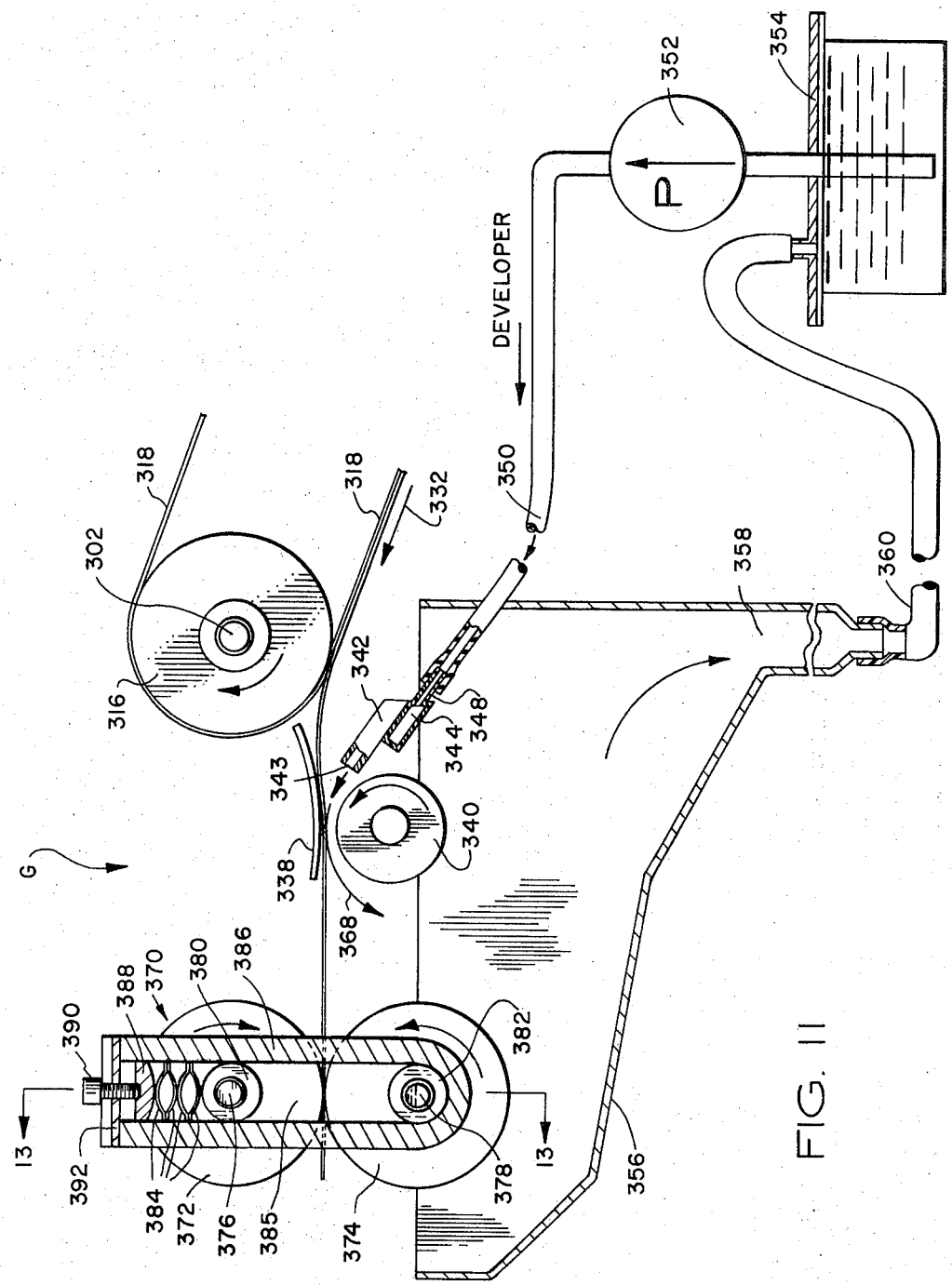
FIG. 11 illustrates a partial section of the device taken on line 11—11 of FIG. 1, looking in the direction of the arrows, showing the developer apparatus.
Figure 12:
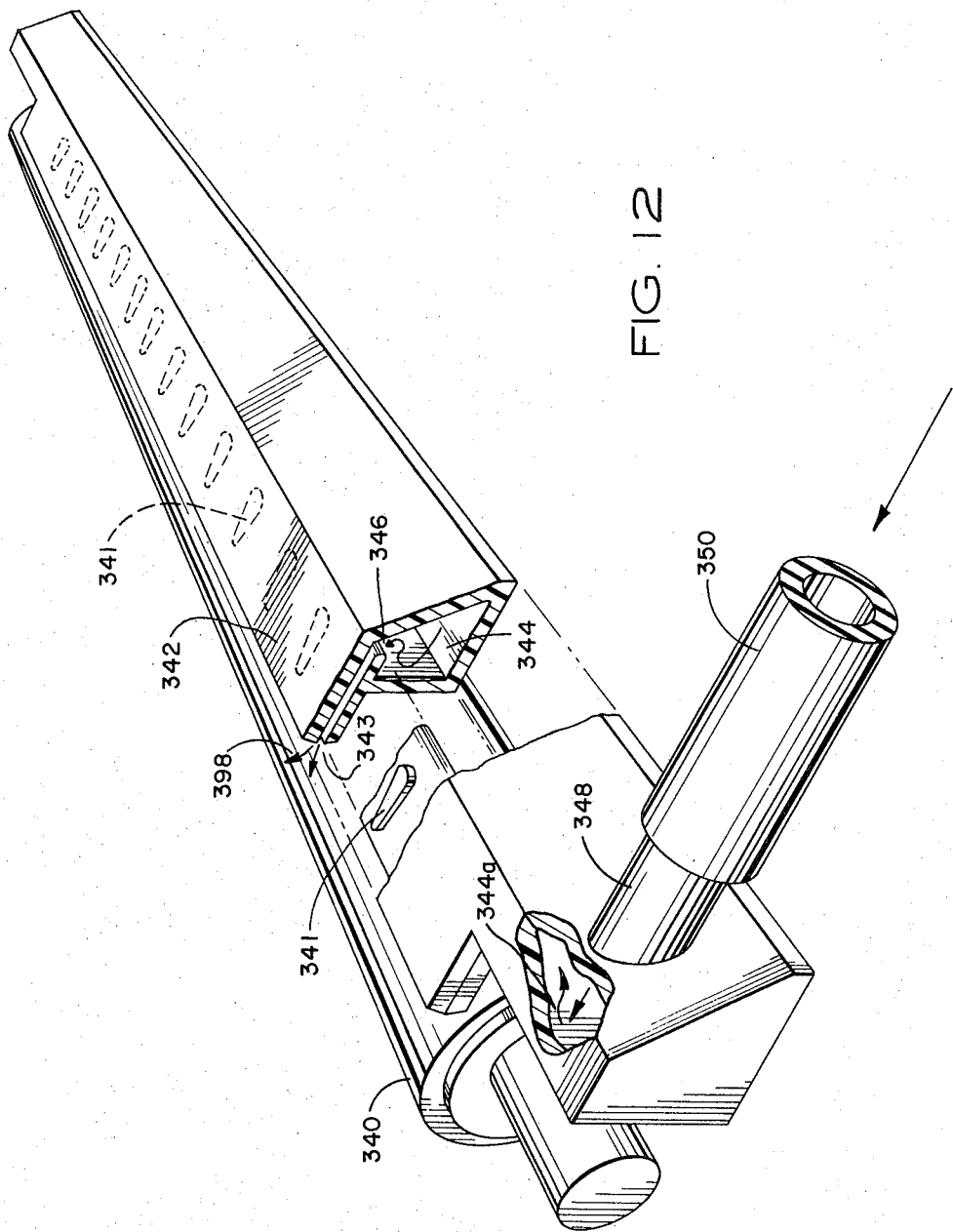
FIG. 12 illustrates a pictorial view of the nozzle and roller assembly of the developer apparatus.

The developer apparatus at station G is shown in detail in FIGS. 11 and 12 as having a driven roller 340 extending across the width of the apparatus and is so disposed that its circumference is adjacent the deflector plate 338. This roller 340 can be driven by suitable gearing, not shown, from the shaft 302. Mounted adjacent the driven roller is a nozzle 342 which extends adjacent the length of the roller 340. This nozzle has a plurality of flow guide vanes 341 therein for controlling the ejection flow, an elongated opening 343 for ejecting the developer fluid, and a supply manifold 344 in fluid communication with the nozzle by way of an elongated restrictive flow aperture of channel 346. The flow channel 346 extends the length of, and is intermediate, the nozzle and supply manifold so that developer fluid supplied to the manifold flows into the full length of the nozzle 342 by way of, and the rate of flow is controlled by, restrictive aperture 346.

The manifold 344 has a suitable supply connector 348 to which is attached a conduit 350 for conveying developer fluid thereto. As a specific feature, the connector 348 is offset as shown in FIG. 12 so that fluid entering the assembly initially impinges against a wall portion 344a of the manifold 344, and thereafter flows through the assembly to the nozzle 342, rather than being directed to the nozzle directly. In this manner, a higher degree of control can be maintained over the fluid being ejected from the nozzle exit 343. The conduit 350 is, in turn, connected with the output side of a pump 352 which draws developer fluid from a developer supply receptacle 354. The developer supply receptacle 354 contains a sufficient volume of developer fluid and is provided with a means, not shown, for replenishing the receptacle with additional developer fluid as required.

The nozzle 342, manifold 344, and driven roller 340 assembly are all positioned over a developer collector tray 356. This developer collector tray 356, provided with conventional sides and a bottom, is so positioned that the developer fluid ejected from the nozzle 342 and impinging the copy paper, as subsequently described, will fall into the developer collector tray. The developer collector tray has a drain 358 connected to conduit 360 connected to the developer supply receptacle 354 so that any developer collected in the tray 356 will return to the developer supply receptacle 354 where it can be again supplied by the pump 352 to the nozzle 342.

In operation, the copy paper, after exposure, moves off the belts 318 and into the space between the deflector plate 338 and driven roller 340 with the side of the paper having the latent image thereon (exposed side) facing the driven roller 340. During this transport time, developer fluid is ejected from the opening 343 of the nozzle 342 at the driven roller 340 and in a direction toward the exposed side of the copy paper (FIG. 11). The nozzle 342 and the roller 340 extend completely across the width of the paper to define a small trough 398 therebetween for containing what amounts to a constantly flowing volume of developer fluid means (not shown) are provided on the ends of the nozzle-roller assembly for containing the fluid within the trough. This developer fluid will be forced up against the driven roller 340, and the exposed side of the copy paper to develop the latent image thereon. Also, due to the fact that the roller 340 is rotating in a counterclockwise direction, as seen in FIG. 11, the fluid forming this trough 398 will be moved over the top of the roller 340, as shown by arrow 368, to move along with the copy sheet, thereby to keep the copy sheet in contact with the developer fluid for an extended period of time. Thus, it can be seen that the nozzle is effective to create the fluid trough 398, through which fluid is continuously agitated and circulated. Thorough contacting of the copy paper with the developer solution is effected without overwetting both sides of the paper and soaking the fibers thereof. This system then produces an improved developed copy which is substantially drier upon leaving the developer apparatus than produced by other systems.

After being treated by the developer, as just described, the copy sheet is transported past the area of the roller 340, and enters a squeegee roller assembly 370 for removing any excess developer fluid which may adhere to the surface of the copy sheet. This assembly 370 comprises a pair of rollers 372 and 374 which are rotatably mounted about parallel spaced shafts 376 and 378, respectively, by means of bearings 380 and 382, respectively. These rollers 372 and 374 are urged in a direction toward one another by means of a plurality of leaf springs 384 which resiliently engage the bearings 380 on both ends of the shaft 376. These bearings 380 and 382 are mounted in each of the slots 385 formed by the frame 386, thus allowing the bearings to move with respect to each other. The leaf springs 384 are held against the bearings 380 by means of an adjustment member 388 which is of such a size to slide in the slot 385. This adjustment member 388 is rotatably attached to an adjustment screw 390, which in turn engages a portion 392 of the frame 386. Thus, it can be seen that by rotating the screw 390, the amount of force exerted by the spring 384 can be adjusted, which in turn varies the force exerted between the rollers 372 and 374. These rollers 372 and 374 have their circumferences in contact and can be driven by a suitable gearing means which can be coupled to the shaft 302.

To accommodate for the bowing in the center of the rollers due to the end loading on the shafts 376 and 378, each roller is provided with a discontinuous cross-section which is larger in the center than it is at the end. This corrects any bowing which may occur and produces an efficient roller arrangement with a constant pressure being supplied along the length of the rollers. Once the copy paper leaves the squeegee roller assembly 370, it exits the apparatus through a slot 394 provided in the front of the housing as shown in FIG. 1.

As can be seen in FIG. 1, the apparatus 20 is provided with a panel for housing a plurality of controls for the apparatus. This panel has a power switch 400, which when actuated provides power to the apparatus; a print initiation switch 402, which when actuated initiates the print cycle; and a print control 406, which controls the time the copy paper is exposed to the image. Additionally, a print ready indicator light 404 is provided on the panel, which is illuminated to indicate that the apparatus is ready to produce a copy.

DESCRIPTION OF THE OPERATION OF THE VIEWER-COPIER APPARATUS

The advantages of the features of the present invention will become more apparent from a consideration of the operation of the viewer-copier apparatus. Initially, the operator places the microfiche film in the film holder 112 by pulling the handle 130 to the position shown as 136 in FIG. 6. The film holder 112 is thereafter returned to the position shown in FIG. 1 and is ready for use. The power switch 400 is then actuated, thus illuminating lamp 58 and operating the fan 74. Next, the microfiche film is positioned so that the desired image is over the aperture 70 and is projected by lamp 58 onto the viewing screen 23. The lens 100 can then be focused to obtain a clear image of the projected microimage.

If the image projected on the screen 23 is desired to be copied, the operator depresses the print initiation switch 402 which, through control means 85 sequentially initiates the following events:

a. the lamp 58 is de-energized;
b. the charger means F is actuated;
c. the developer pump motor is energized;
d. solenoid 278 is energized to cause idler gear 270 to contact friction gear 268 and start the paper drive;
e. the paper is moved by friction wheels 220 from the storage area E until it is engaged by the feed rollers 282, 283, 286, and 287 which moves the paper to and through the charger apparatus F;
f. as the paper is moved by feed rollers 286 and 287 from the charger apparatus, it actuates switch 296 which in turn de-energizes solenoid 278, which causes the idler roller 270 to move away from the friction gear 268 to position 270a and thus disengage the paper feed mechanism;
g. the paper is then conveyed by the rollers 286 and 287 onto the moving belts 318 to the exposure station D;
h. the paper is then moved by endless belts 318 until switch 336 senses the paper in the correct position, whereupon the motor 244 is de-energized, and the movement of the paper ceases, the fan 330 holding the paper in the stationary position on the belts;
i. simultaneously, the switch 336 energizes lamp 58 for a period of time as determined by the adjustment of control 406, to expose the print copy to the projected image for the correct period of time to discharge the negative charge on the paper; and
j. thereafter the motor 244 is again energized moving the paper to and through the developer station G and then out of the apparatus through slot 394. Once the paper clears the apparatus 20, print light 404 is energized indicating to the operator that the apparatus is ready to produce another copy, whereupon the above process can be repeated.

The foregoing description relates to one specific embodiment of the viewer-copier apparatus of the present invention. It is obvious, of course, that various modifications are contemplated and may be resorted to by those of ordinary skill in the art without departing from the spirit and scope of the invention as hereinafter defined by the appended claims.

What is claimed and desired to be secured by letters patent is:

1. An apparatus for viewing information and for selectively producing copies of said information on photosensitive recording medium, said apparatus comprising:
   a hollow housing,
   means in said housing for providing a uniform electrostatic charge on said photosensitive recording medium,
   optical means in said housing for producing an optical image to create an electrostatic charge pattern on said photosensitive recording medium,
   means for applying liquid developer to said photosensitive recording medium to produce a visible recorded image corresponding to said charge pattern on said recording medium,
   a transparent viewing screen means mounted with said housing,
   means for selectively positioning said recording medium at an exposure station in said housing,
   means within said housing for directing said image simultaneously to said screen means so that said image can be viewed from the exterior of said housing as well as to said exposure station to expose said recording medium, said directing means being so oriented with respect to said optical means and said viewing screen means so as to increase the polarization of either the light energy corresponding to the ambient light entering the viewing screen or the light energy corresponding to the image directed to the exposure station while correspondingly decreasing the polarization of the other light energy which has not been so increased in polarization, and
   means between said directing means and said exposure station for effectively blocking the so polarized ambient light energy.

2. An apparatus as defined in claim 1 wherein said directing means is a mirror partially reflective and partially transmissive to light energy.

3. Microfilm viewer and copying apparatus, comprising:
   a. microfilm means containing information thereon,
   b. a viewing screen and a copy exposure station,
   c. means for simultaneously projecting a light image representative of said information at said viewing screen and said copy exposure station,
   d. means for effectively blocking ambient light entering the viewing screen from reaching the exposure station,
   e. storage means for storing record medium which is to be advanced to said exposure station, said storage means including a deflector portion for reducing electrostatic and frictional forces between adjacent sheets of record medium within said storage means,
   f. electrostatic charging apparatus for charging said record medium,
   g. means for conveying said charged record medium to said exposure station,
   h. developer means for producing a visible image of a latent image representing said information produced at said exposure station, said developer means including a first elongated nozzle and roller co-extensive with said nozzle for producing a trough of developer fluid contacting said record medium at the exposed side thereof, and i. means for removing excess developer fluid from said record medium, said means comprising, a pair of longitudinal rollers having external contact surfaces, bearing means contacting the ends of said rollers to mount said rollers to rotate about spaced parallel axes, means for rotating said rollers at a rate so that points on said contact surfaces of each roller move at equal linear velocities, loading means contacting said bearing means for urging said roller in a direction toward each other, and adjustment means for varying the force that said rollers are urged in a direction toward each other by said loading means.

4. The apparatus as defined by claim 1 wherein said directing means maximizes the polarization of said ambient light energy while minimizing the polarization of said image light energy.

5. The apparatus as defined by claim 4 wherein said directing means is a mirror partially reflective and partially transmissive to light energy, and said mirror is so oriented that the ambient light principal ray strikes the surface of said mirror at an angle of incidence of approximately 90° while the image principal ray strikes the surface of said mirror at approximately 45°.

6. Microfilm viewer-printer apparatus, comprising:
 a. a viewing station,
 b. an exposure station,
 c. optical means for producing an optical image corresponding to the information which is to be viewed and which is also to be reproduced on photosensitive record medium,
 d. means for providing an electrostatic charge on said photosensitive record medium,
 e. means for directing said optical image to said viewing station and also to said exposure station for creating a latent image on said record medium corresponding to said optical image,
 f. means for moving said record medium from said exposure station past a developing station, and
 g. means for applying developer to said record medium at said developing station to produce a visible recorded image thereon corresponding to said latent image, said means for applying developer comprising a nozzle for dispensing developer in a direction to contact only one side of said record medium, said nozzle having an elongated dispensing opening extending across said moving record medium in a direction transverse to the direction of movement of said record medium.

7. An apparatus as defined in claim 6 wherein said developer dispensing means additionally comprises a manifold in fluid communication with said nozzle means for supplying developer to said nozzle means, and a flow restrictor means located between said mainfold and said nozzle for controlling the flow of developer from said manifold to said nozzle.

8. An apparatus as defined in claim 2 wherein inlet tube means are provided to said manifold to receive developer from a developer supply means, said inlet tube being located so that flow from said tube is directed against a surface within said manifold.

9. An apparatus as defined in claim 6 wherein said dispensing opening of said nozzle has a plurality of flow guide vanes disposed therein.

10. An apparatus as defined in claim 6 wherein said nozzle is positioned to dispense developer in an upward direction against the underside of said conveyed record medium.

11. Apparatus as defined in claim 5 further including a roller, developer ejected from said dispensing opening impinging on said underside adjacent said roller when said record medium is in a substantially horizontal position.

12. Microfilm viewer-printer apparatus for simultaneously viewing information and for selectively producing copies of said information on photosensitive recording medium, said apparatus comprising:
 a. a viewing station,
 b. an exposure station,
 c. optical means for producing an optical image corresponding to said information which is to be viewed and which is to be reproduced on said photosensitive record medium,
 d. means for providing an electrostatic charge on said photosensitive record medium,
 e. means for directing said optical image to said viewing station for viewing said information and also to said exposure station for creating an electrostatic charge pattern on said record medium corresponding to said optical image, and
 f. means for feeding individual sheets of said photosensitive record medium toward said electrostatic charge providing means, said feeding means comprising
 tray means for supporting a stack of a plurality of said sheets of photosensitive record medium,
 selectively operable first means for frictionally engaging a surface of a top sheet of said medium in said stack and for urging said top sheet to move in a direction parallel to the plane of said sheet, second means for engaging said top sheet as said top sheet is moved away from said stack and for pulling said sheet completely from said stack, and
 electrically conductive deflector means positioned between said stack and said second means for discharging electrostatic charges on said top sheet and for frictionally engaging and discharging electrostatic charges on the conductive side of sheets of said record medium in said stack adjacent said top sheet, thereby preventing said adjacent sheets from being moved to and engaged by said second means during the feeding of said first sheet by said first means.

13. The apparatus as defined by claim 12 wherein said stack is electrically insulated from said tray means.

14. The apparatus as defined in claim 13 wherein said deflector means is grounded.

15. The apparatus as defined in claim 14 wherein said second means for engaging said top sheet comprises a pair of feed rollers mounted to rotate about spaced horizontal shafts, one of said feed rollers being constructed of conductive material and being positioned to contact the conductive side of said sheet record medium as said sheet record medium is fed through said second feed means, said one of said feed rollers being effective to additionally discharge electrostatic charges from said record medium.

* * * * *

UNITED STATES PATENT OFFICE
CERTIFICATE OF CORRECTION

Patent No. 3,811,769         Dated May 21, 1974

Inventor(s) Stanley W. Heldenbrand; David L. Johnson; Neil H. Mote

It is certified that error appears in the above-identified patent and that said Letters Patent are hereby corrected as shown below:

Column 3, Line 7, "is" should be --it--;

Column 4, Line 30, "to" should be --the--;

Column 8, Line 49, "slat" should be --flat--;

Column 11, Line 7, "ain" should be --an--;

Column 19, Line 57, Claim 8 should be dependent on Claim 7, not Claim 2;

Column 20, Line 3, Claim 11 should be dependent on Claim 10, not Claim 5.

Signed and sealed this 8th day of October 1974.

(SEAL)
Attest:

McCOY M. GIBSON JR.
Attesting Officer

C. MARSHALL DANN
Commissioner of Patents